Patented Apr. 12, 1949

2,466,963

UNITED STATES PATENT OFFICE 2,466,963

POLYSULFIDE POLYMER

Joseph C. Patrick, Morrisville, Pa., and Harry R. Ferguson, Trenton, N. J., assignors to Thiokol Corporation, a corporation of Delaware No Drawing. Application June 16, 1945, Serial No. 599,973

37 Claims. (Cl. 260—79.1)

This invention relates to polysulfide polymers.

One of the objects of this invention is to solve a problem of long standing in this art, i. e., the "cold flow" problem. A further object is to produce new products (and processes of making the same) existing, without the necessity of using solvents or dispersion media, in a liquid form and so reactive that upon suitable treatment they may be converted into polysulfide polymers. These liquids are of great utility in various arts. The two objects will be further and separately discussed. They are both achieved through using the same basic technique.

Regarding the first-mentioned object, i. e., solution of the "cold flow" problem, it has been known for a long time that in many uses of the polysulfide polymers available prior to this invention, the property of "cold flow" is a disadvantage. For example, polymeric material is frequently used as a gasket to seal joints between surfaces. The gasket is placed between the surfaces, these are forced toward each other and into pressure contact with the gasket and the latter is compressed. To maintain its desired sealing effect, the gasket material should have an adequate tendency to resist the deformation caused by compression and to recover its original dimensions. In other words, the material should possess to a considerable extent the properties of a spring, i. e., the ability of recovering its original shape after release from the action of deforming compression forces and the tendency to recover during the application of those forces.

Linear polysulfide polymers have very little power of recovery and therefore possess the disadvantage of "cold flow."

By bridging the linear chains with cross connecting "links" or groups of atoms, the power of recovery may be imparted to the polysulfide polymers.

The advance in the art represented by the first above-mentioned object of the present invention includes improved means of rendering the cross linked polysulfide polymers amenable to the numerous processing treatments necessary in many uses of said polymers. It will be understood by those skilled in the art that not only polysulfide polymers but also other polymers including natural and the various "synthetic" rubbers must, in order to be of general application, exist in two forms—a temporary soft, plastic or workable form and an ultimate permanent form in which the non-plastic properties are fully developed. In the temporary form the polymer may be mixed with various compounding and curing or vulcanizing ingredients and molded or shaped in various forms or spread out as a coating or tubed and extruded from orifices of various shapes. The polymer must then be capable of being converted from this temporary condition of workability or plasticity into its ultimate condition in which all of its properties are developed. This transformation is known as curing.

Polymers which are sufficiently cross-linked to have high powers of recovery tend, in general, to be so intractable that their field of utility is limited.

In accordance with the present invention the valuable properties of the cross linked polymers are retained while imparting to them a new property, i. e., converting them into a temporarily soft plastic or workable condition in which they are amenable to any desired processing treatment and from which condition they may readily be converted into their permanent or ultimate condition in which their ultimate properties of non-plasticity and freedom from "cold flow" under pressure are fully developed.

Generically, one manner in which this result may be achieved is the splitting or cleavage of the cross linked molecules into smaller molecules. The cleavage products have a lower average molecular weight, less viscosity, higher solubility in solvents and greater plasticity than the parent substances. As a result of these properties, they are amenable to various processing treatments and may be mixed with various ingredients, molded, extruded, used as coating or impregnating substances and rendered generally useful. Notwithstanding the change on splitting, they retain the ability of being cured, by methods disclosed herein, and in the cured condition their ultimate properties are fully developed, including the property of relative freedom from "cold flow." In other words, the invention involves a dismemberment of the refractory cross linked polymer in such a manner that the terminal groups resulting from the dismemberment process are left as potentially highly reactive groups. The polymer while in this dismembered or disjointed state is highly plastic, and is eminently workable; it can be readily compounded and worked on rubber working machinery of standard type. After being processed, compounded and given its final useful shape the polymer can, by virtue of the highly reactive groups left by the particular method of dismemberment used, be caused to react with itself into its final useful shape to rebuild a highly tough, resilient, chemically stable cross linked lattice.

It is to be noted that the splitting process is not limited to the cross linked polymers. It may be applied to polysulfide polymers in general. The application to cross linked polymers has been emphasized in the above description because this particular use of the splitting process has contributed importantly to the solution of the outstanding problem of "cold flow." In many instances the linear polysulfide polymers do not require splitting because they are sufficiently workable without such treatment. However, there are cases where splitting and subsequent curing constitutes a distinct improvement in achieving certain desirable properties in a linear polymer, as will be more fully hereinafter described.

At this point the above-mentioned other important object of the invention may be mentioned, i. e., the production of a polysulfide polymer in a form having at least three outstanding characteristics as follows:

(1) A liquid form, i. e., a form in which the polymer is capable of being poured, at ordinary or elevated temperatures, cast or readily spread and impregnated into fibrous or porous materials capable of impregnation; (2) a polymer having such reactivity that it can be readily cured, i. e., the polymer in its liquid form is curable not only at elevated temperatures but also at room temperature or below; (3) a polymer possessing not only the characteristics 1 and 2 but also existing as a liquid, continuous phase.

A polymer possessing these characteristics is capable of a wide variety of useful applications. For example, it may be cast into any desired form and cured in that form over a wide range of temperatures or it may be used as a coating or impregnating compound.

Polysulfide polymers have, of course, been prepared in solution in solvents and dispersed in aqueous liquids. It will be understood that the present invention provides marked advantages over polysulfide polymers in the form of solutions or dispersions in solvents, since in accordance with the present invention the transition of the polymer from the liquid to the ultimate solid polymer in cured condition may be effected without elimination or evaporation of a solvent or dispersing medium. For example, if it is desired to make a printer's roller, a composition in accordance with the present invention may be poured into a suitable cylindrical mold and cured therein to yield a desired product. Obviously such a procedure could not be readily carried out with a polymer dissolved in a solvent or dispersed in a dispersing medium. It follows from the fact that no substantial proportions of dispersing medium or solvent are necessary in the application of this material, that where, as in the above example a fairly simple molding or casting operation was described resulting in a cylindrical molded object, the production of cast articles from complicated molds may be readily accomplished because no substantial change in volume occurs as a result of the polymerization of the molding material. Moreover, the porosity which would accompany the evaporation or elimination of a solvent or dispersing medium is obviated. Another advantage of the invention is the fact that the transformation from the fluid, liquid or flowable state to the ultimate solid form corresponding to fully cured condition may occur at ordinary room temperatures, thus obviating the necessity of heating equipment during the casting, molding, or other operation involving said transformation. This is advantageous veen with relatively small sized objects but is particularly advantageous when the size of the object or area thereof becomes so great that heating equipment for the molding or curing operation would be unduly expensive or awkward.

Still another advantage is that the curing can be carried out without the necessity of the pressure required in curing many plastics. In other words, the present invention makes possible the casting of many objects in a wide variety of geometrical forms without the necessity of either pressure or elevated temperatures and thus greatly simplifies the operation and eliminates expensive and time-consuming operations and equipment. The consistency of split polysulfide polymers may vary over a wide range. In accordance with that part of the present invention relating to liquid polymers, the consistency is limited to that range in which the split product is liquid or capable of being flowed at ordinary temperatures, e. g., 25° C., or capable of being readily poured. The product having this consistency may then be mixed with a curing agent, flowed or poured into any desired mold, spread as a coating or used as an impregnating compound and then cured. The products of this invention are so reactive that curing may be effected very quickly at ordinary temperatures if desired, for example, in a matter of minutes.

The present invention does not, of course, exclude the use of elevated temperatures or pressures if such are desired in any given case.

The polymer in its fluid condition is capable of being mixed with various modifying materials such as, for example, ground cork, asbestos, cotton flock, wood flour, carbon black and various other inorganic and organic compounding ingredients. The products so formed have valuable properties due to their capacity of flowing or being poured without the assistance of volatile solvents or dispersion media, their curing properties and the fact that in cured condition the polymers are highly resistant to organic solvents including gasoline, oil, etc., as well as water and retain their rubber-like or resilient character over a wide range of temperatures.

The resistance to organic solvents displayed by the polymers after cure is all the more remarkable when it is considered that the uncured or unpolymerized state is characterized by very ready miscibility with or solubility in a number of ordinary organic solvents such as benzene, xylene, and chlorinated hydrocarbons.

Another advantage of this aspect of the invention is that the pourable or flowable product is miscible with a large number of plasticizers and extenders with some of which, it is believed, chemical combination occurs. For example, if it is desired that the final product exist in a relatively soft condition, the pourable product may be mixed with a plasticizer or mixture of plasticizers and the curing carried out so that the transformation from the fluid to the cured or solid condition occurs in the presence of the plasticizer which is dispersed or in some cases dissolved in the polymer and vice versa, i. e., the polymer may be partially dissolved or dispersed in the plasticizer. Moreover, various resinous and other polymeric materials may be blended with the polymers in their pourable condition and the compound resulting from the blending may be cured as herein set forth. For example, a polymer made in accordance with the present invention may be blended with hydrophilic colloids, including gelatin and glue, and polyhydric alcohols including glycol, glycerine, sorbitol, and the like to produce a special form of plastic capable of advantageous use as a printer's roll. In this way the water resistance and heat resistance of the conventional glue-glycerine printer's roll combination is greatly improved indicating some sort of combination between the components thereof and the products of this invention.

The invention will be defined in the claims and further described in the following description. For purposes of clarity, this description will be arranged in three topics:

(1) Formation of the polymers, both linear and cross linked or three-dimensional.

(2) Splitting or cleavage of said polymers to produce solid and liquid products and (3) Curing of the split products.

As an alternative to (2) synthesis of polymers having a molecular weight not exceeding about 50,000 to 75,000 by oxidation of monomeric polymercaptans or lower molecular weight polythiopolymercaptans is also disclosed. This alternative may be identified as (2a).

Formation of the polymers

The art of polysulfide polymers includes a number of patents issued to Joseph C. Patrick and reference will be had thereto for an exposition of the polysulfide reaction, these United States patents including the following:

| Patent No. | Date of Issue |
| --- | --- |
| 2,049,974 | Aug. 4, 1936 |
| 2,100,351 | Nov. 30, 1937 |
| 2,142,144 | Jan. 3, 1939 |
| 2,142,145 | Jan. 3, 1939 |
| 2,195,380 | Mar. 26, 1940 |
| 2,206,641 | July 2, 1940 |
| 2,206,642 | July 2, 1940 |
| 2,206,643 | July 2, 1940 |
| 2,216,044 | Sept. 24, 1940 |
| 2,221,650 | Nov. 12, 1940 |
| 2,235,621 | Mar. 18, 1941 |
| 2,255,228 | Sept. 9, 1941 |
| 2,278,127 | Mar. 31, 1942 |
| 2,278,128 | Mar. 31, 1942 |

These patents contain extensive descriptions of the formation of linear polymers.

In the formation of a cross linked or three dimensional polymer, an organic compound is used which contains three or more functional substituents or groups. Two of these groups give rise to linear chain growth and one or more additional groups may be employed to cause bridging or cross linkage of the linear chains. The specific character of these functional groups is subject to considerable variation. Insofar as chain growth and cross linkage of the chain is concerned generically, it is not so much the specific character of the group as it is the generic functionality of the latter which is important. For example, in the case where there are three functional groups, all three may be substituents capable of being split off by reaction with a polysulfide. All three may be mercapto or mercaptide groups which react with oxidizing agents to produce polymeric growth characterized by recurring —S— linkages. Various combinations of mercapto or mercaptide groups and groups capable of being split off by reaction with the polysulfide may also constitute the functional groups. For example, two of the groups may be SH groups and a third group may be a substituent which is split off by reaction with a polysulfide and conversely, two of the substituents may be those which are split off by reaction with a polysulfide and a third substituent may be an SH group. The reaction is a general one and is not limited to any particular compound having a particular carbon structure. Insofar as the mechanism of the reaction is concerned, it is not the specific carbon structure of the compound which is important but rather the existence of the necessary functional groups. Consequently the number and variety of organic compounds which may be employed in making polysulfide polymers, both linear and cross linked, is very large. Commercially, of course, the number is somewhat restricted for economic reasons. In the cases of the functional groups above mentioned, the mechanism of the reaction causing linear chain growth may be the same as the mechanism of the reaction which causes cross linkage of these chains, and it will be the same when the functional groups which cause linear chain growth are the same as the substituents or substituent which causes cross linkage.

Linear chain growth and cross linkage of the chains have a mechanical analog, the substituents producing chain growth and cross linkage acting in a manner analogous to the building up of an ordinary chain through union of the links, these chains being provided with means therealong to effect bridging or linkage of the chains. It will therefore be apparent that cross linked polysulfide polymers may be obtained, in general, from organic compounds containing at least two substituents adapted to produce linear chain growth and at least one substituent adapted to effect cross linkage of the chains. As above stated, insofar as linear chain growth is concerned, it is not the specific character of the functional groups which produces chain growth which is primarily important, but rather the functionality of these groups. So also in effecting cross linkage, insofar as the mechanics of the reaction is concerned, it is not primarily the specific character of the functional group which produces cross linkage which is important but rather the functionality of that group. It is therefore possible to have a considerable variety of functional substituents to effect both chain growth and cross linkage. The functional group which produces cross linkage may or may not be the same as the functional substituents producing chain growth.

As clearly set forth in the Patrick patents and application above referred to, the polysulfide polymers are characterized by regularly recurring sulfur linkages. These linkages may comprise from about two to about six sulfur atoms. Two of these sulfur atoms which may be identified as the disulfide —SS— linkage are firmly bound directly to carbon atoms and the remainder, if a polysulfide higher than a disulfide has been used in the preparation of the polymer, exist in a looser chemical combination with the disulfide sulfur atoms, said remaining sulfur atoms being sometimes referred to as isosulfur. This isosulfur may be removed by a "stripping" or desulfurizing step, as set forth in Patrick U. S. Patent 2,278,128.

The unit of the chain is the organic compound minus its functional substituents in combination with the sulfur linkage. Thus if the organic compound is bifunctional the polymeric unit is —SRS— or $R(S-)_2$, if trifunctional the polymeric unit is $R(S-)_3$, if tetrafunctional the polymeric unit is $R(S-)_4$, if pentafunctional the polymeric unit is $R(S-)_5$, etc. In general where the functionality of the organic compound is more than two the corresponding polymeric unit is $R(S-)_x$ where R has a sulfur connected valence equal to X and X is a whole number greater than two. Where a compound or mixture of compounds is employed all characterized by polyfunctionality, the chains will be highly cross linked, that is, there will be a cross linkage or branched chain at each unit along the main chain. It is frequently desirable to vary the average spacing of the cross linkages and this may be done by employing in conjunction with a polyfunctional compound one which has only bifunctionality and will therefore not give rise to cross linkage. By this means any desired average spacing of the cross linkages along the resulting copolymeric chain may be obtained dependent upon the molecular ratio of the polyfunctional to bifunctional compound.

*Specific examples showing formation of cross linked or three dimensional polymers*

Purely for the purpose of illustrating the general principles above described, the following specific examples will be given:

*Example 1.*—Reaction of an alkaline polysulfide with a mixture of dichlor diethyl formal and 1, 2, 3 trichlor propane to produce a copolymer having a predetermined spacing of the bridges or cross connecting links.

The specific reaction is carried out by the use of 60 mols of sodium tetrasulfide containing as a dispersing agent magnesium hydroxide produced by the addition to the polysulfide solution of 160 grams of sodium hydroxide and 400 grams of crystallized magnesium chloride ($MgCl_2.6H_2O$). The reaction mixture is preferably heated to about 60° C., and then has added to it a mixture consisting of 49 mols of dichlor diethyl formal and 1 mol of 1, 2, 3 trichlor propane. The ratio is 49 to 1 for the purpose of producing cross linkages along the chain at an average spacing of one cross link to each fifty units of polymer. The mixture of the organic halides is added slowly so that a period of about one hour is consumed by the addition, during which time the reacting polysulfide mixture is kept under continuous and efficient agitation to produce a highly dispersed latex-like reaction product. The cross linked polymer produced by this reaction may be maintained in the form of a latex and utilized in this form, or may be separated by any of the known methods. In either event it may be subjected to splitting, and curing of the split or cleavage products, as hereinafter set forth.

It will be understood that in the above example instead of using the dichlor diethyl formal, organic compounds in general having two functional substituents capable of being split off by reaction with polysulfide may be substituted for the dichlor diethyl formal, and instead of the 1, 2, 3 trichlor propane organic compounds in general containing three or more substituents capable of being split off by reaction with a polysulfide may be employed, e. g., three or more halogen atoms. The purpose of the bifunctional compound is to produce linear chain growth only, and the purpose of the trifunctional or polyfunctional compound is to produce not only linear chain growth but also cross linkage or chain branching. The generality of the reaction both in respect to bifunctional and polyfunctional compounds will be apparent from the disclosure herein. A list of compounds having a functionality of three or more will be found in Table I, infra.

It has been found that the average spacing of these cross linking groups affect very materially the physical properties of the resultant polymer. For example, in the event that a reaction is carried out involving 1, 2, 3 trichlor propane alone, the resultant polymer is a hard tough material which displays rubber-like or elastic properties to only a small degree and evidently represents chemically a very close space lattice in three dimensions, whereas, as in the case of the above example where a copolymer is made containing a statistical distribution of cross linking members which would correspond to about one cross link in fifty units of the linear chain, a highly elastic, rubber-like product is obtained.

However, it will be understood that both types of compounds may be subjected to the splitting processes of the present invention.

*Example II.*—Preparation of cross linked polymer using a polyfunctional compound alone and obtaining a product characterized by a very dense three dimensional space lattice.

Proceed as in Example I, omitting the dichlor diethyl formal and using a molecular ratio of polysulfide to 1, 2, 3 trichlor propane of 8 to 5.

*Example III.*—Proceed as in Example II substituting tri (chloro methoxy) benzene for the trichlor propane, employing these compounds in the same molecular proportions in relation to polysulfide.

*Example IV.*—Proceed as in Example I, substituting 1 mol of trichloro benzene for the 1, 2, 3 trichlor propane.

However, it must be noted that in carrying out this reaction it will be necessary to utilize a pressure vessel or autoclave in order that temperatures of around 150° C. to 175° C. may be used in order to substitute the chlorine atoms attached to the benzene ring and employing a length of time, e. g., 4 or 5 hours, sufficient to effect the polysulfide reaction.

*Example V.*—Proceed as in Example I substituting 49 mols BB' dichlor ethyl ether for the dichloro formal and 1 mol of 1, 1, 2 trichlor ethane for the 1, 2, 3 trichlor propane.

*Example VI.*—Proceed as in Example I substituting 48 mols of chloroethoxy chloroethyl ether for the dichloro formal and 2 mols of a chlorinated paraffin (e. g., one having the empirical formula $C_{24}H_{44}Cl_8$) for the 1, 2, 3 trichlor propane.

*Example VII.*—Proceed as in Example I but use only 40 mols of dichloro formal and substitute 10 mols of BB' gamma gamma prime tetrachloro normal propyl ether for the 1 mol of 1, 2, 3 trichlor propane.

In the above examples, similar results may be obtained by substituting —SH groups, in whole or in part, for the substituents split off by reaction with polysulfide and employing oxidizing agents to effect reaction of the —SH groups and thus employing the principle of the mercapto condensing reaction, these principles being described in Patrick U. S. Patent 2,142,145, issued January 3, 1939. Sulfur linkages obtained by the oxidation of mercapto groups are —SS— linkages without isosulfur and it is therefore not mandatory to apply the stripping step to remove isosulfur from those linkages.

*Splitting or cleavage of the polymer*

This reaction involves splitting or cleaving the polysulfide polymer at —SS— linkages thereof with generation of mercaptan or mercaptide terminals.

The generic principles and certain species or sub-genera thereof will be illustrated by the following equations or symbolic representations. For the sake of simplicity, a linear polymer will be indicated and symbolized by the formula —RSSR— which is an abbreviated form or segment of the symbol —RSSRSSRSSRSS— standing for a linear polymer of the unit (RSS).

Case 1.—Generic:

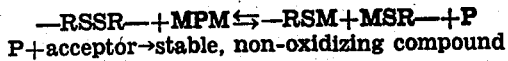

P+acceptor→stable, non-oxidizing compound

Case 2.—MPM=water:

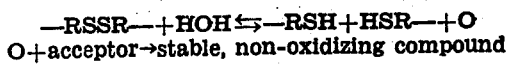

O+acceptor→stable, non-oxidizing compound

Case 3.—MPM=alkaline hydrosulfide:

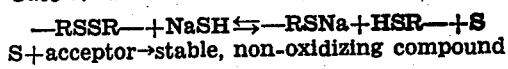

S+acceptor→stable, non-oxidizing compound

Case 4.—MPM=an alkaline monosulfide:

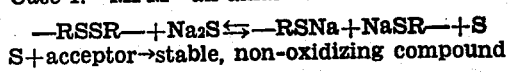

S+acceptor→stable, non-oxidizing compound

Case 5.—MPM=H₂S:

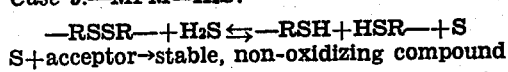

S+acceptor→stable, non-oxidizing compound

Case 6.—MPM=an alkaline hydroxide:

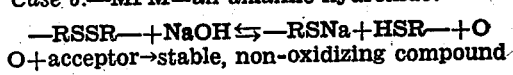

O+acceptor→stable, non-oxidizing compound

Case 1 represents the generic principle. P represents the element supplying the oxidative potential and may be oxygen or sulfur. M is an element or elements capable of combining with the split —SS— linkages to form mercaptan or mercaptide terminals and may be hydrogen, alkali metals or both, or ammonium.

By using an acceptor the reactions can be made to go to any desired extent, e. g., a polymer molecule having a molecular weight of say 100,000 to 200,000 may be split so that the average or statistical molecular weights of the products may be 75,000, 50,000, 40,000, 30,000 20,000, 10,000, etc., all the way down to the monomer. The polymeric cleavage or hydrolytic products are polythiopolymercaptans which are either solid or liquid at normal temperature e. g., 25° C. The solid products have molecular weights within the range of about 15,000 to 75,000 and the liquid products have molecular weights within the range of about 500 to 12,000.

The mercaptan and mercaptide terminals of the hydrolytic products are very reactive and the products having those terminals will recombine and cause shifting of the equilibria to the left with reformation of the polymeric products in the presence of oxidizing agents. It is therefore necessary in accordance with the present invention to use substances which will combine with the element supplying the oxidative potential to form a stable non-oxidizing compound.

If oxygen is the substance that supplied the oxidative potential there is added to the system a substance that will combine with oxygen to form a stable non-oxidizing compound. Nascent hydrogen generated by the action of various metals, e. g., zinc, on the hydrogen of acids or water will convert oxygen into water, which is a stable non-oxidizing compound. In an alkaline medium as indicated by sub-genus 5, nascent hydrogen, e. g., generated by the action of various metals, e. g., zinc and aluminum, on alkalies may be used. Alkaline pyrogallates and oxygen acceptors in general may also be used provided the result of the acceptance is a non-oxidizing compound.

In that form of the invention for which a preference is expressed at this time, the oxidative potential is caused by sulfur and the principles are indicated by Cases 3, 4, and 5 above. To discharge the oxidation potential due to sulfur by combining therewith to form a stable, non-oxidizing compound, sulfites have been found to be an effective species of sulfur acceptors.

Sulfites in general, e. g., those of potassium, lithium, sodium, ammonium, calcium, magnesium, barium, strontium, iron, manganese, cobalt, nickel, etc., and also the organic sulfite esters, e. g., ethyl and methyl sulfites, may be used. The hydrosulfites, e. g., sodium hydrosulfite and the various materials known as "rongalites" in the dye industry may also be used. Ordinary ronaglite is a condensation product of formaldehyde and sodium hydrosulfite having the formula $CH_2O.NaHSO_2.H_2O$. All of the above substances, including nascent hydrogen, may be used as oxygen or sulfur acceptors. They are merely examples and the invention is not limited to the use thereof. The principle involved is the use of any substance which combines with oxygen or sulfur (or the equivalent thereof) to form a stable, non-oxidizing compound.

Now as to the technique for controlling the extent of the splitting action. This technique may be illustrated as follows:

Let it be supposed that we have a polymer of the unit (SRS) having a molecular weight of say 100,000 to 200,000 and that it is desired to split it into a product having an average molecular weight corresponding to any desired number of units (SRS) by means of, say sodium hydrosulfide, (NaSH), and sodium sulfite. Polymers having molecular weights of the order mentioned are obtained by the procedures of Examples I to VII or the procedures shown in the Patrick patents listed above. The reactions involved are as follows:

To effect complete splitting of the polymer down to the monomeric products SHRSH and NaSRSH, at least approximately one mol of NaSH is required for each mol of the polymeric unit SRS in order to provide sufficient sodium and hydrogen from the NaSH to combine with the ruptured —SS— linkages to form the necessary mercaptan and mercaptide terminals. The minimum proportions are approximately one gram atom of sodium and approximately one gram atom of hydrogen for each mol of the unit (SRS). These proportions are equivalent to approximately one gram atom of sulfur for each mol of said unit (RSS).

Furthermore, in order to effect this complete splitting in accordance with this invention, a minimum of approximately one mol of $Na_2SO_3$ is necessary to combine with the sulfur and convert it to the stable non-oxidizing sodium thiosulfate.

For many purposes it is desired not to split down to the monomer but to control the reaction so that polymeric products of any predetermined or chosen molecular weight may be obtained.

The rule has been developed that the minimum number of gram atoms of sulfur per unit of (SRS) equal to the mols of $H_2S$, hydrosulfide or monosulfide containing said sulfur) equals $1/n$ where $n$ is the number of units desired in the final split product. The molecular weight of the product desired equals $n$ times the average molecular weight of said unit.

To illustrate the rule, suppose that a linear polymer is made according to Example I using only dichlordiethyl formal and sodium tetrasulfide, i. e., omitting the 1, 2, 3 trichlor propane, and stripping down to the disulfide form by treatment in accordance with Patrick U. S. Patent 2,278,128, March 31, 1942. The molecular weight of said polymer is high, e. g., about 200,000. The unit of that polymer is

—SCH$_2$CH$_2$OCH$_2$OCH$_2$CH$_2$S— having a molecular weight of 166. The average molecular weight of various split products depends on the average number of said units in the molecules of said products.

If it is desired to produce a product the average molecular structure of which consists of 6 units, then a minimum of ⅙ of a mol of NaSH, Na$_2$S or H$_2$S is necessary for each unit. If a product the molecular structure of which consists of 60 units, then one sixtieth (1/60=0.0165) of a mol of NaSH, Na$_2$S or H$_2$S will be required.

The following table shows the relation between the molecular weight of product desired, the number of units therein and the minimum number of mols of NaSH, Na$_2$S or H$_2$S required to effect the necessary splitting.

| A<br>M. W. | B<br>Number of Units (A/166) | C<br>Mols of NaSH Na$_2$S or H$_2$S per unit |
|---|---|---|
| 1,000 | 6 | ⅙ |
| 1,660 | 10 | 0.1 |
| 3,320 | 20 | 0.050 |
| 5,000 | 30 | 0.0330 |
| 10,000 | 60 | 0.01660 |
| 20,000 | 120 | 0.00835 |
| 30,000 | 180 | 0.00550 |
| 50,000 | 300 | 0.00333 |

The use of the minimal amounts of reagents, as listed in the above table, is based on the assumption that the reaction will be carried out under conditions such that contamination by atmospheric oxidation of the split products shall not take place.

Such experimental conditions can be readily realized, for example, by passing a current of inert gas such as nitrogen through the reaction mixture thereby displacing the atmosphere of air above the surface of the materials undergoing reaction. However, where operations are carried out on a fairly extensive scale, it is equally feasible to dispense with an inert gas to protect the system from oxidation and still achieve the desired result by increasing the quantities of the splitting reagents, especially the oxygen acceptor, to amounts considerably greater than those called for in the above table. In view of the fact that the amount of extraneous oxidation is effected by not only the size and shape of the tank or reaction vessel in which the operation is carried out, but also by such factors as speed of agitation, etc., it is impossible to give a hard and fast rule as to how much of an excess over the quantity shown in the above table is to be used in any given instance. However, there will be submitted certain examples taken from plant practice (see Examples XI, XII and XIII) which will show the proportions of reagents employed to effect the above stated purpose wherein as an alternative to the use of an inert atmosphere an excess of oxygen acceptor is employed, and these examples will be a sufficient guide to those skilled in the art in the light of present disclosure.

It is now necessary to more fully explain the meaning of the term "unit" in order to cover cases where copolymers are made from substances having different specific structures and also cases where the molecule has monosulfide linkages as well as disulfide. Consider, for example, a copolymer made as follows:

First, four mols of ethylene dichloride are reacted with four mols of Na$_2$S$_{1.5}$ (equivalent to a mixture of Na$_2$S$_2$ and Na$_2$S in equi-molecular ratios) to make a polymer. This is then reacted, e. g., in latex form with a polymer made by reacting 1 mol of dichlor diethyl formal with one mol of Na$_2$S$_2$.

The structures of the separate polymers are shown as follows:

(a)
—S] [SC$_2$H$_4$SC$_2$H$_4$S] [SC$_2$H$_4$SC$_2$H$_4$S] [S—

(b)
—S] [SC$_2$H$_4$OCH$_2$OC$_2$H$_4$S] [SC$_2$H$_4$OCH$_2$OC$_2$H$_4$S] [S—

A comprehensive definition of the term "unit" is the number of atoms included between the brackets shown above, i. e., the atoms included in the segment produced when cleavage is effected between the sulfur atoms of two consecutive —SS— linkages as shown above.

In the above copolymer there is no single uniform unit because the structure of the units differs. We can, however, calculate an average molecular weight of an average unit as follows:

Unit (a) (SC$_2$H$_4$SC$_2$H$_4$S) has a M. W. of 152
Unit (b) (SC$_2$H$_4$OCH$_2$OC$_2$H$_4$S) have a M. W. of 166

$$2 \times 152 = 304 = 2(a)$$
$$1 \times 166 = \underline{166} = 1(b)$$
$$3\overline{)470}$$
$$157$$

The average unit is therefore one having a molecular weight of 157. It was necessary to multiply unit (a) by 2 because 4 mols of ethylene dichloride were used to 1 mol of dichlorethyl formal and 2 of the units (a) contain 4 ethylene radicals.

Having arrived at the molecular weight of the average unit, as above set forth, then the same rule is applied as in the case where the unit is uniform.

As above stated, in addition to the substance M$_2$S which supplies the hydrogen or alkali atoms M (which in turn create mercaptan or mercaptide terminals by combination with the sulfur atoms of the ruptured —SS— links) and also creates the oxidative potential S in equilibrium with the polysulfide polymer, there is used a further substance to discharge that potential S by forming a stable, non-oxidizing compound therewith.

Indeed the equilibrium will be disturbed and thus proceed only to the extent that the element S is combined with an acceptor thereof to form a stable, non-oxidizing compound.

Having ascertained the minimum necessary number of mols of the substance M$_2$S, it is then necessary to provide enough acceptor to combine with the S of the compound M$_2$S to convert said S into a stable, non-oxidizing compound.

The reaction therefore has two mutually dependent controls (1) the proportion of compound M$_2$S and (2) the proportion of acceptor necessary to convert the sulfur of M$_2$S into a stable non-oxidizing compound. Reaction (1) will proceed only to the extent that the S of M$_2$S is combined and rendered non-oxidizing by union with the acceptor. If too much M$_2$S is used, the splitting can be controlled to go only to the desired extent by using only that proportion of acceptor which will combine with the S from the correct proportion of the compound M$_2$S.

The same rules and principles apply to compounds of the general formula M₂P where P, which may be oxygen or sulfur, supplies the oxidative potential and M which may be hydrogen, an alkali metal or ammonium, supplies the elements necessary to form mercaptan or mercaptide terminals with the S atoms of the ruptured —SS— linkages. M₂P may be water (HOH), hydrogen sulfide (H₂S), or an alkali metal or ammonium hydrosulfide or monosulfide, or an alkali metal or ammonium hydroxide.

The number of gram atoms of P (equal to the mols of M₂P) for each mol of polymeric unit equals $1/n$ where $n$ is the number of units in the molecule of the desired product; and sufficient acceptor must be used to combine with said number of gram atoms of P. If desired, an excess of acceptor may be used to make certain that element P is properly combined. If an excess of compound M₂P is accidentally or intentionally used, the reaction may be controlled by using appropriate proportions of acceptor as above explained.

In addition to the theoretical minimum quantity of acceptor employed, an excess may be added as above explained.

In addition to using a proportion of splitting agent based on the theoretical minimum quantity thereof, it is desirable to empirically check the extent of splitting or cleavage by certain tests. In general, as the extent of splitting or cleavage increases, the viscosity of the split products decreases and the solubility thereof in solvents increases. It is convenient therefore to employ viscosity and solubility tests as an index of the extent of splitting.

Where an alkaline disulfide is used to produce the cross linked polymer, the sulfur linkage involved is essentially the disulfide or —SS— linkage, and when such a polymer is subjected to treatment as described herein, splitting occurs immediately at —SS— linkages of said polymer. While these linkages occur both in the linear chain and in the cross linkages which connect those chains, it is not necessary to know whether the splitting occurs wholly in the cross linkages or wholly in the chains or partly in one and partly in the other, since the observed physical phenomena are congruent with either or both kinds of cleavage. However, when alkaline sulfides having a rank higher than 2, e. g., sodium trisulfide, tetrasulfide or hexasulfide are used, the sulfur linkages, as already stated, comprise not only the disulfide linkages having both sulfur atoms firmly bound to adjacent carbon atoms but also isosulfur atoms joined to said —SS— linkages, and when a polymer of this character is treated with a reducing agent, a stripping of the isosulfur occurs prior to or coincident with the splitting action. Therefore, a polymer in which the —SS— linkages contain isosulfur groups may, prior to splitting, be subjected to a stripping or partial desulfurizing action in order to remove the isosulfur in whole or in part, and such preliminary stripping action is preferably employed. The mechanism thereof may be clearly seen by reference to Patrick U. S. Patent 2,278,128, issued Mar 31, 1942.

It has been found, however, that where highly cross linked polymers are employed, that is, where a rather dense space lattice is involved due to frequency of the recurrence of the cross linked bridges along the chain, it may not be desirable to remove the isosulfur as completely as possible prior to the splitting action and that by retaining all or a portion of this isosulfur more effective splitting occurs. A possible explanation of this phenomenon is that the presence of the isosulfur may prevent the attainment of the highest degree of density by the closely linked lattice structure involved and permits easier penetration of the dense space lattice by the splitting reagent used.

As to the temperature of the splitting reaction, it will proceed at room temperature although, like other chemical reactions, the velocity is increased with increasing temperature, and temperatures in the neighborhood of 70° C. are conveniently employed.

The following specific examples will be submitted in order further to illustrate the principles and rules hereinabove described. In these various examples, the use of the splitting agent having the chemical formula M₂P will be described in conjunction with an acceptor which unites with the oxidizing agent P to form a stable, non-oxidizing compound. Five subgenera have been referred to, these being alkaline hydrosulfides, alkaline monosulfides, hydrogen sulfide, alkaline hydroxides and water. It has been pointed out that the extent of splitting is subject to a dual control, one of the controls being the mol ratio of compound M₂P to the unit —SRS— and the other being the proportion of acceptor necessary to combine with the oxidizing element P to form a stable non-oxidizing compound. There has been pointed out that the minimum ratio of the compound M₂P to the unit —SRS— is $1/N$ where N equals the number of units which go to make up the structure of the molecule in the desired product and that it is necessary to have a sufficient mol ratio of acceptor to combine with the element P to form a stable non-oxidizing compound. It has also been pointed out that an excess of splitting agent may be employed greater than the minimum ratio necessary to affect splitting to the degree desired and that the necessary control can then be affected by using that proportion of the acceptor necessary to combine with the element P from that proportion of compound M₂P calculated to produce the desired degree of splitting.

In some cases, it is, as a matter of practical convenience, easier to control the reaction by using an excess of compound M₂P and affecting the desired control by adjusting the proportion of acceptor in the manner described. This, however, is a matter of convenience and does not limit or vitiate the scope of any of the principles herein set forth. For example, when water is used as splitting agent, it is easier to employ an excess of water and to control the extent of the reaction by varying the ratio of acceptor (e. g., by varying the proportion of nascent hydrogen by varying the amount of reactive material used to produce said nascent hydrogen) than it is to employ different proportions of water calculated to produce the desired degree of splitting. It will be understood from what has been said that where an excess of water has been employed, the reaction may be controlled by varying the proportion of acceptor so that it is equivalent to the oxygen which would be produced by using a proportion of water calculated to produce the desired extent of reaction.

So also where hydrogen sulfide is employed as splitting agent, it is more convenient to use an excess of this gas over and above that necessary to produce the desired degree of splitting and to control the reaction by using varying amounts of alkaline sulfites; for example, corresponding to the calculated proportions of hydrogen sulfide necessary to produce the desired degree of splitting. However, here again this is merely a matter of convenience and does not limit or vitiate the principles hereinabove described. In the case of alkaline hydrosulfides, monsulfides and hydroxides, it is convenient to use at least the minimum proportion of compound $M_2S$ calculated to affect the necessary splitting action in conjunction with the necessary proportion of acceptor to combine with the element S.

Case 2.—Use of water as the substance $M_2P$

*Example VIII.*—The polymer may be made by reacting 2½ liters of 2 molar sodium disulfide to which has been added 25 grams of freshly precipitated magnesium hydroxide with 4 mols of dichloro diethyl formal by agitation and heating. The latex-like dispersion which results from this reaction which consists of a finely divided high polymer is washed free from soluble salts and excess polysulfide by repeated treatment with warm water with intermediate decantation. The latex-like dispersion of the high polymer obtained above appears to be stable in the presence of pure water but this apparent stability is due to the fact that although a hydrolytic equilibrium is set up between the polymer and the water, this equilibrium goes to only a slight extent unless means are employed to discharge the oxidation potential set up as a result of this equilibrium. The presence and disturbance of this equilibrium can readily be shown by producing a small amount of nascent hydrogen within the body of the liquid.

To a latex made as described above are added 26.0 grams of powdered zinc (equal to 0.1 gram atom Zn or 6.5 grams Zn per unit mol of polymer or per mol of formal) and the dispersion is heated to approximately 100° C., in a flask equipped with an agitator and reflux condenser for a period of about four hours. The original high polymer which was rubbery and very elastic and possessed a high molecular weight of the order of 100,000 to 200,000 is now in the form of a low molecular weight material and the analysis of the liquid shows that a considerable amount of zinc hydroxide is present.

In accordance with the discussion which has already been given regarding the control of the reaction to control the average molecular size of the final product, there was used in this particular example an amount of zinc which corresponds to .1 of a gram atom per unit mol of polymer. The final product of the above reaction which was run to completion resulted in a polymer which had been split down to approximately ten units corresponding to a molecular weight of about 1600.

*Example IX*—*Use of water as the substance $M_2P$.*—Proceed as in Example VIII except that 1/50 of a gram atom of zinc is employed per unit mol of polymer and since four mols were used, we have used 4/50 or .08 of a gram atom of zinc or 5.2 grams of zinc in the form of powder. This reaction is run at least four hours. The product obtained from this reaction has a molecular weight of approximately 8000 corresponding to about 50 units as compared with the moleculor weight of about 1600 in Example VIII.

*Example X*—*Use of water as the substance $M_2P$.*—Proceed as in Example I except substitute for the dichlor diethyl formal 49 mols of chloroethoxy chloroethyl ether. As a dispersing agent in this case, substitute 1000 grams of freshly precipitated barium sulfate for the 400 grams of crystallized magnesium chloride. The latex is then heated with 60 mols of NaOH to about 90° C. for about 30 minutes to remove labile sulfur and washed free from polysulfide. To the latex is now added 100 grams of concentrated sulfuric acid and 65 grams of granulated metallic zinc. The latex, while being kept thoroughly agitated, is heated to about 70° C. for about one hour, at the end of which time the zinc sulfate is washed out and the latex is collected on a suitable filtering medium, since it is of a type which cannot be coagulated readily with acids. The product derived from this reaction is a very highly viscous liquid having a molecular weight of about 8000. In contrast therewith the polymer obtained from the latex of the example prior to splitting has properties similar to those of the unsplit polymer derived from Example I, that is to say, the unsplit polymer is a tough material resembling highly cured rubber. Notwithstanding the fact that the split polymer of this example is a highly viscous liquid and therefore amenable to a wide variety of processing treatments, it is potentially highly reactive and may be cured by employing the principles hereinafter explained, and when so treated may be converted into a tough, resilient, rubber-like mass.

The means of controlling the average size of the molecule of the product as used in Examples VIII to X will be clear by reference to the following:

Grams atoms $H_2$ (equivalent to the O in the water entering into the splitting action) divided by the number of mols of polymeric unit (equal to the number of mols of organic polyfunctional compound used) equals $1/n$ where $n$ equals the number of units in the polymer desired.

Therefore, when zinc is used to generate hydrogen (1Zn equals 2H).

$$\frac{\text{Grams atoms Zn}}{\text{Number mols organic substance}} = \frac{1}{n}$$

Gram atoms zinc per mol organic substance $= 1/n$ $$n = \frac{1}{\text{Gram atoms zinc per mol organic substance}}$$

In Example VIII, about 10 units were desired in the molecule of the split product (average molecule). Therefore gram atoms Zn per mol of functional organic compound equals 0.1. Since 4 mols of organic substances were used 4×0.1 equals 0.4 gram atoms of zinc equals 26 grams.

In Example IX about 50 units were desired. Therefore, the gram atoms of zinc per mol of organic functional substance equals 1/50 equals 0.02. Since 4 mols of organic substance were used, the gram atoms of zinc equal 4×.02 equals .08 equals 5.2 grams.

In Example X, 1 gram atom of zinc or 65 grams were used to about 50 mols of the chloroethoxy chloroethyl ether. Therefore 1/50 equals $1/n$ and $n$ equals 50 corresponding to a molecular weight of 50×(M. W. of the principal unit $CH_2CH_2 \cdot O \cdot CH_2 \cdot CH_2 \cdot O \cdot CH_2 \cdot CH_2 \cdot SS) = 8300.$

Case 3. Use of alkaline hydrosulfides as the substance $M_2P$

*Example XI.*—To 9.6 lb. mols of sodium tetrasulfide dissolved in 560 gallons of water there are added 15 lbs. of sodium hydroxide and 48 lbs. of crystalline magnesium chloride. The mixture is preferably heated to about 180° F. and to it are added a mixture consisting of 8 lb. mols of dichlorethyl formal and 0.04 lb. mols of 1, 2, 3 trichloropropane. The mixture of the organic halides is added slowly so that a period of about one hour is consumed by the addition during which time the reaction polymer mixture is kept under considerable agitation to produce a highly dispersed latex-like reaction product. The reaction mixture is continuously heated for 30 minutes at 180° F. after all of the mixture of halide is into the tank after which the latex-like dispersion is raised to 212° F. and held at that temperature for 15 minutes to be sure of completion of reaction. The latex thus produced is washed several times with water and settled out after each washing. The washed latex is preferably treated with 8 lb. mols of sodium hydroxide used in the form of a 50% by weight aqueous solution with constant agitation and is heated to a temperature of about 170° F. for a period of one hour to remove all labile or isosulfur from the polymer. The latex is then washed twice with water as described previously and is subjected to a second stripping process by adding to the latex 0.8 of a lb. mol of sodium monosulfide. The latex is again heated for a period of 30 minutes at 180° F. The latex is then washed free from the polysulfide formed as a result of this stripping process. The treatment to effect partial dismemberment or splitting is then carried out as follows:

To the washed latex are added 2.6 lb. mols of anhydrous sodium sulfite followed by the addition of 0.24 lb. mols of sodium hydrosulfide and heated to 180° F. for 30 minutes. Then settle and decant. The water can be removed by any suitable means such as, for example, by evaporation or the polymer may be coagulated from its dispersion in water by treatment with acid.

The polymer may be marketed as such, and if handled commercially in this way will be mixed with suitable compounding and vulcanizing materials as hereinafter set forth, and cured.

If the latex as produced in Example I had been coagulated, the polymer thereby obtained would exhibit a great deal of difficulty in processing, as for example, mixing with compounding and vulcanizing ingredients. In general it would have been similar in its behavior to a fully cured rubber which, as is well known, is not amenable to the various processing treatments necessary in order to shape it and apply it in various forms.

In contrast therewith the polymer obtained by the splitting action of Example XI is a thermoplastic compound which may readily be subjected to any of the conventional treatments desirable in connection with the processing of polymers which are subsequently to be cured. It may be mixed on mixing rolls with various compounding and vulcanizing ingredients; it may be readily extruded and spread or coated. It may also be maintained in the form of a latex and is found to deposit a smooth, coherent coating when the latex is used as a coating material, probably due to the fact that the relative softness of the particles or micelles are such as to cause suitable coalescense. Comparing this split product with the latex of Example I (containing the unsplit polymer), that latex upon the evaporation of the water content deposits a highly granular or pulverulent, non-coherent coating, the particles of which do not coalesce.

In addition to processing these highly desirable properties, the split product produced as per Example XI possesses, as will subsequently be shown more in detail, the valuable property of reacting with condensing agents which cause curing whereby the ultimate properties desired are developed, these ultimate properties including the very important property of resistance to "cold flow." This particular property may be measured by a standard A. S. T. M. test which measures the extent of recovery after the material has been compressed to a predetermined degree.

To illustrate the value of the splitting process, it may be pointed out that the polymer as produced in Example XI, when compounded and cured as hereinafter set forth, shows a recovery when tested in accordance with a standard test comparable with that of natural rubber, e. g., about 80 percent, whereas a linear polymer such as would be produced in accordance with Example I, omitting the trichlor propane, would have no recovery at all when tested under comparable conditions.

It will be seen that the present invention makes it possible to readily produce a polymer in which there is combined the valuable properties of the cross linked polymers including their resistance to "cold flow," with the plasticity and workability of the linear polymers and it will be seen that, expressed in lay language, the invention involves essentially a taking apart of the cross linked polymers in order to produce a product which can be processed readily and a putting together again in the final form in which they will be required to exhibit their maximum properties.

The process as described in Example XI produces a product which when separated from its aqueous dispersion is at normal temperatures, e. g., about 25° C., a solid, millable product having a molecular weight within the range of 15,000 to 75,000. Examples XII and XIII will show the production of polymers which at normal temperatures, e. g., about 25° C. are in a liquid flowable condition.

*Example XII.*—To 8.4 lb. mols of sodium polysulfide of rank of 2.25 dissolved in 540 gallons of water, there are added 48 pounds of crystallized magnesium chloride and 15 pounds of flake caustic soda. The mixture is preferably heated to 185° F. and to it are added a mixture consisting of 8 lb. mols of dichlorodiethyl formal and 0.04 lb. mol of trichloropropane. The mixture of the organic halides is added slowly so that a period of about one hour is consumed. During this feed the heat of reaction is used to carry the temperature up to 210° F. During this time the reacting polysulfide mixture is kept under continuous and efficient agitation to produce a highly dispersed latex-like reaction product. At the end of the halide feed the reaction mixture is held for 60 minutes at 212° F. The latex is washed free from soluble salts by treatment with water by washing by intermittent decantation. In order to produce a satisfactory degree or state of polymerization in the latex just described, it is desirable to employ an after treatment which comprises heating the latex in the presence of 2 lb. mols of disulfide of sodium in the form of a 2-molar solution of that salt. The polysulfide polymer dispersion is then heated 30 minutes at a temperature of 185° F. after which the excess polysulfide is removed by washing and decanting. The latex is again washed twice to remove most of the soluble salts. The latex is then "split" or depolymerized by treatment with 0.8 lb. mol of sodium hydrosulfide (NaSH) and 4.4 lb. mols of sodium sulfite (Na₂SO₃). The latex is heated with agitation in the presence of these splitting salts for 60 minutes at 180° F. The latex is washed until substantially free from soluble materials. It is then caused to coagulate by the addition of an amount of acid which will produce a reaction corresponding to about a pH of between 4 and 5. The agglomerated polymer produced by this acid treatment is then washed completely free from soluble salts preferably by the use of cold water. The molecular weight of the product resulting from the above treatment is found to vary between 4000 and 5000 determined cryoscopically by solution in benzene and to have a molecular size of between 25 and 30 units, whereas the molecular weight of the polymer prior to the splitting treatment just described was too high to be quantitatively determined by any of the ordinary methods known to the chemist for determining molecular weight. The molecular weight of that polymer may be estimated at between 100,000 to 200,000. The product produced by the splitting has the formula

HSRSSR . . . SSRSH from which it will be seen that it is essentially an organic polythio polymercaptan.

*Example XIII.*—Production of a polydisulfide polymer in liquid form having a lower molecular weight than that produced as per Example XII.

Proceed as in Example XII down to the point where the splitting or dismemberment steps are described and then proceed as follows:

In the instant example the splitting process is carried out by the addition to the washed latex of 1.6 lb. mols of sodium hydrosulfide (NaSH) and 4.4 lb. mols of anhydrous sodium sulfite ($Na_2SO_3$). The latex containing the splitting salts is heated with considerable agitation for a period of one hour at a temperature of 180° F. The split latex is acidified directly with acetic acid without intermediate washing and the final pH of the liquid is adjusted to 4–5 after which the semi-liquid reaction polymer is washed by settling and decanting with successive changes of water until substantially free from soluble salts. The product thus obtained is a liquid flowable product at normal temperatures, e. g., about 70° F. this being also true of the polymer produced in Example XII and the appearances of these two polymers is similar except that the viscosity of the polymer of Example XIII is much less than that of Example XII. The molecular weight of the product of Example XIII is approximately 1200 corresponding to from 7–8 units.

*Case 4.—Use of alkaline monosulfides as the substance $M_2P$.*

*Example XIV.*—Proceed as in Example XII down as far as the point where the splitting treatment was carried out by means of sodium hydrosulfide and sodium sulfite and instead of using these reagents, proceed as follows:

2 liters of the latex-like dispersion of the high polymer is so adjusted as regards solid content that 5 unit gram molecular weights are present in the volumes chosen. $\frac{1}{10}$ of a mol of sodium monosulfide corresponding to $\frac{1}{10}$ of a mol of sodium monosulfide per unit molecular weight is dissolved in the aqueous dispersion so as to produce a split product having a molecular weight corresponding to 10 unit molecular weights of the original high polymer. 1.5 mols of sodium sulfite were dissolved in the dispersion, this amount of sodium sulfite corresponding to $\frac{3}{10}$ of a mol per unit molecular weight of the polymer present, e. g., mol ratio sulfite to monosulfide equals 3 to 1. The reaction flask in which this splitting reaction is carried out is fitted with suitable means of acidification and is also fitted with an inlet tube by which all atmospheric oxygen can be removed and prevented from reentering during the course of the splitting reaction.

Before the reaction was started a stream of carefully purified nitrogen was led through the system and this stream of inert gas was continued throughout the splitting reaction. When the nitrogen stream had been continued for a few minutes to insure the complete sweeping out of all oxygen, the temperature of the stirred suspension was raised to 60° C., and maintained at that temperature for one hour. At the end of this time the liquid was acidified to a pH of about 3 by the addition of 10% acetic acid with the stream of inert gas still passing so that oxidation of the liquid while it was alkaline and before it had been neutralized by the acid could not take place. The product of this splitting reaction was separated and purified by washing with water and then dried. It was found to be a liquid having a viscosity corresponding to that of pure glycerin. The molecular weight was found to be 2100, which is only slightly higher than the theoretical prediction for this reaction which would be 1660.

The reason that the necessity for complete exclusion of atmospheric oxygen as stressed in the above example is contained in the fact that when a disulfide type polymer is split with sodium monosulfide, the split products consist entirely of sodium mercaptide terminals and it has been found that an aqueous dispersion of a polymer having sodium mercaptide terminals is an exceedingly powerful reducing agent so much so in fact that even a trace of atmospheric oxygen or the small amount of oxygen which is likely to be present in commercially pure nitrogen is sufficient to upset predictions based on the theory. Therefore, it is essential to assure complete absence of oxygen in this particular case in order to approximate closely to the theoretical results. In other words, the complete exclusion of air or oxygen is not essential to produce splitting. It is merely one way of producing splitting to the extent corresponding to that calculated in advance.

*Case 5.—Use of hydrogen sulfide, as the substance $M_2P$*

*Example XV.*—Proceed as in Example XII down as far as the point where the splitting treatment was carried out by means of sodium hydrosulfide and sodium sulfite and instead of using those reagents proceed as follows:

2 liters of the latex-like dispersion of the high polymer is so adjusted as regards solid content that 5 unit gram molecular weights are present in the volume chosen. $\frac{1}{10}$ of a gram mol of sodium sulfite per gram mol of polymer is dissolved in the aqueous dispersion contained in a reaction flask equipped with means for mechanical stirring and in-let and out-let tubes for the passage of gas through the liquid. The reactor is so arranged that tight closure is possible and hydrogen sulfide gas is passed through the dispersion which is constantly agitated at such a rate that about 50 bubbles per minute are counted in the bubble trap placed between the hydrogen sulfide container and the reaction vessel. The escaping gas is trapped in a caustic soda trap so disposed that a pressure of about 1 foot of water is maintained in the reaction vessel at all times. The reaction vessel is heated to about 40° C., for 2 hours with constant passage of the gas, after which the gas trap is disconnected and the reaction of the dispersion is adjusted to a pH of about 4 to 5 by running in dilute acetic acid. The reaction product is allowed to settle out of the aqueous dispersion, and is purified by washing with water until free from soluble salts and is then dried. The molecular weight of this material was found to be 1400, which is well within the allowable limits predicted by theory which is about 1660.

Case 6. Use of alkaline hydroxides as the substance $M_2P$

*Example XVI.*—Proceed as in Example VIII except that prior to the addition of the 25 grams of powdered zinc there is added to the dispersion 1 mol of sodium hydroxide and the dispersion is heated to approximately 100° C. in a flask equipped with an agitator and reflux condenser for a period of about 30 minutes. The original high polymer which was rubbery and very elastic and possessed a high molecular weight, so high in fact that ordinary methods of determining molecular weight were not applicable, is now in the form of a liquid of fairly low viscosity. The alkaline dispersion is treated with acetic acid until the reaction is adjusted to a pH of about 4 and the reaction product is allowed to settle out of the aqueous dispersion. The supernatant liquid is removed and the polymer is purified by washing with water until free from soluble salts. It is then dried. The molecular weight was found to be approximately 1500 which corresponds quite closely to the predicted 1660.

The properties of the liquid polythiopolymercaptans of this invention are illustrated by the following properties of the product obtained by the process of Example XIII. Ordinarily the range of molecular weights of the liquid polymers will be about 500 to 8000 for many purposes but may extend up to about 12,000.

| | |
|---|---|
| Specific gravity at 20/20°C. | 1.275 |
| pH | Slightly acid |
| Maximum per cent by weight $H_2O$ | 0.2 |
| Viscosity at 20° C. centipoises | 2000 |
| Molecular weight, average | 1200 |
| Pour point | 24°C. |
| Vapor pressure at 20° C. mm. Hg | 0.01 |
| Color | Amber |
| Solubility in water at 20° C. | Insoluble |
| Average weight per gal. at 20° C. lb. | 10 |

Solubilities

| | |
|---|---|
| Acids, organic | Insoluble cold—soluble hot |
| Alcohols, saturated | Insoluble cold—insoluble hot |
| Alcohols, unsaturated | Soluble cold—soluble hot |
| Aldehydes | Soluble cold—soluble hot |
| Hydrocarbons, aliphatic | Insoluble cold—soluble hot |
| Hydrocarbons, aromatic | Soluble cold—soluble hot |
| Hydrocarbons, chlorinated | Soluble cold—soluble hot |
| Amines | Soluble cold—soluble hot |
| Esters | Soluble cold—soluble hot |
| Ethers | Soluble cold—soluble hot |
| Ketones | Soluble cold—soluble hot |
| Nitroparaffins | Soluble cold—soluble hot |
| Nitrites | Soluble cold—soluble hot |
| Olefins, aliphatic | Insoluble cold—insoluble hot |
| Olefins, aromatic | Soluble cold—soluble hot |
| Phenols | Soluble cold—soluble hot |
| Mercaptans | Soluble cold—soluble hot |

It has been pointed out that in order to control the degree of splitting and thus control the average molecular size or molecular weight of the products obtained so as to produce, for example, either normally liquid products or products which are solid and readily millable, that a number of mols of the substance $M_2P$ equivalent to the mols of element P per mol of polymer unit is based on the rule that the said number of mols equals $1/n$ where $n$ is the number of polymer units desired in the product to be obtained.

It will be clear that the technique here involves first starting with a high molecular weight polymer and decreasing the average molecular size to the desired extent, that is, the polymer initially chosen has a higher molecular weight than that of the product desired. It is possible to reach the same objective from a different starting point, that is, by starting with a product having a lower molecular weight than that desired and controlling the polymeric growth to obtain a product having the molecular size and therefore characteristics desired. For example, one may start with a monomeric bi- or multifunctional mercaptan and cause polymerization or condensation to the desired extent in accordance with the present invention by means of condensing agents.

In general the reaction of polymers by the mercaptan reaction has been described in a number of Patrick patents including U. S. 2,142,144; 2,142,145; 2,195,380; 2,206,643; 2,221,650 and others. To that knowledge there is now added the new principle of controlling the molecular size of the polymer desired by limiting the amount of available oxygen as hereinafter set forth. In this way the molecular weight of the product may be controlled so as not to exceed 50,000 to 75,000 as distinguished from polymers having molecular weights of the order of 100,000 to 200,000. In this reaction the specific nature of the oxidizing agent, speaking generically, is immaterial; and therefore a large number of oxidizing agents may be employed since it is the oxygen or its equivalent which is generically essential rather than the particular source from which the oxygen comes. In this reaction sulfur as, for example, in the form of a polysulfide, is equivalent to oxygen and is an oxidizing agent.

In order to control the course of the reaction to obtain the desired product, the proportion of oxidizing agent is limited so that the number of atoms of available oxygen equals $$\frac{n-1}{n}$$

per mol of monomeric mercaptan or per mol of polymeric unit where $n$ equals the number of units in the polymer product obtained.

The reaction may be thus controlled to produce polymers liquid at ordinary temperatures, e. g., 25° C., i. e., polymers having molecular weights of about 500 to 1200 and such polymers will be linear or cross linked depending on the functionality of the starting compounds. The reaction may also be controlled to produce cross linked polymers solid at ordinary temperatures and having molecular weights ranging from about 15,000 to 50,000 to 75,000. These polymers may be processed, e. g., compounded, etc., on rubber mixing rolls and then cured to produce cured polymers having any desired degree of recovery from deformation depending on the extent of cross linkage or density of space lattice structure.

The general formula of the linear polymers is HS (RSS)$_{n-1}$R SH where R is the structure of the monomeric mercaptan minus the —SH groups thereof.

The preparation of a liquid polymer having approximately seven of the units (RSS) will be illustrated by the preparation of a polythiopolymercaptan having the formula

HS(CH₂CH₂.O.CH₂.O.CH₂CH₂SS)₆
CH₂CH₂.O.CH₂.O.CH₂CH₂SH

This has a molecular weight of about 1200.

*Example XVII—Preparation of the liquid polymer.*—In this particular example, the preparation of a polymer having a molecular weight of about 1200 will be described but it will be understood that the molecular weight may vary over quite a wide range, i. e., the condition of liquidity is consistent with polymers having a rather wide range of molecular weights as, for example, from that of dimers up to polymers containing a large number of polymer units and having a molecular weight up to about 12,000. For many purposes a range of molecular weights, for the liquid polymer, of 500 to 8000, will be found useful. In this particular example the polymer will be prepared by the oxidation of dimercapto diethyl formal, HSCH₂CH₂OCH₂OCH₂CH₂SH. Seven and one half mols of dimercapto diethyl ether are dispersed in water to which is added 14 mols of sodium hydroxide and the dispersion so formed is carefully protected from atmospheric oxidation. To the dispersion, while being rapidly stirred, is added a solution of hydrogen peroxide containing 6.5 mols of H₂O₂ and therefore equivalent to 6.5 gram atoms of available oxygen. The reaction takes place at room temperature and after the addition of the hydrogen peroxide solution is continued for about 15 minutes using a water bath when necessary to prevent the temperature from rising above about 60° C. At the end of the reaction period, the reaction liquid is treated with a solution of acetic acid containing 15 mols of acetic acid or slightly more than the equivalent required to neutralize the reaction liquid which is then allowed to settle and the supernatant liquid poured off. The oily layer is then purified by successive washings with water and intermittent settling by decantation.

The properties of this product are similar to those of the product obtained by the process of Example XIII.

Another method of making a polythiopolymercaptan by the oxidation of a monomeric mercaptan is as follows:

*Example XVIII.*—10 mols of dimercapto ethyl ether or 1380 grams are emulsified with 3000 cc. of water containing 50 grams of Mg(OH)₂ and about 2 grams of a suitable wetting agent, e. g., a rosin soap. On vigorous agitation a smooth emulsion is produced. A solution is made containing 9 mols of sodium peroxide (Na₂O₂) and this solution is added slowly and with constant agitation to the emulsion containing the mercaptan using suitable means to prevent the temperature from rising. Agitation is continued for about one half hour at ordinary temperatures after which the emulsion is acidified to a pH of about 3 and allowed to settle. The product which settles out is washed free from acid with water and dried and is a liquid polythiopolymercaptan having properties generally similar to those listed above. Molecular weight equals about 1300, the theoretical molecular weight being 1360 equivalent to 10 times the molecular weight of the unit

C₂H₄.O.C₂H₄SS i. e., 10×136=1360.

In the above Examples XVII and XVIII any of the mercaptans listed in said Patrick patents, e. g., 2,142,145 may be substituted and, in order to make cross linked polymers, organic compounds in general containing at least two carbon atoms and at least three carbon-attached halogen atoms or their equivalent may be substituted as well as mixtures thereof. Also any of the compounds listed in subjoined Table I may also be substituted.

If in Example XVIII it should be desired to make a polymer having a molecular weight of about 13,000 to 14,000 corresponding to a theoretical molecular weight of 100×136, then $n=100$ and it would be necessary to use 0.99 atoms of available oxygen for each mol of dimercapto diethyl ether.

The invention is not limited to the production and treatment of polymers having a space lattice structure and includes linear polymers. The invention relates to the treatment of both linear and cross linked relatively high molecular weight polymers whereby they are partially dismembered to produce products having controlled consistencies, that is, viscosities and plasticities, and controlled molecular weights, lower than those of the polymers originally selected for treatment, and also the synthesis of linear and cross linked polymers from monomeric compounds or those of relatively simple structure whereby products of higher complexity and molecular weights are obtained within a predetermined and controlled range or ranges of molecular size and corresponding ranges of physical properties.

The linear polymers may be defined as comprising a series of units having the general formula —SRS— linked together to form a polymer where S is a sulfur atom and R is a radical having structure selected from the group consisting of

designating a single carbon atom

designating two adjacent carbon atoms, and

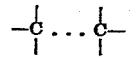

designating two carbon atoms joined to and separated by intervening structure. This general formula may be used to designate not only the high molecular weight polymers which are subjected to cleavage treatment but also the lower molecular weight products formed either by the cleavage treatment or the method of synthesis.

The polymers having a space lattice structure, that is, the cross linked polymers, may be defined as polymers of the unit

Here R' has a more limited definition than that given above. It is defined as a radical having structure selected from the group consisting of

and

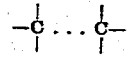

This symbol may be used to designate both the high molecular weight polymers prior to cleavage treatment, e. g., those having a molecular weight higher than 75,000, and also those obtained either by that cleavage treatment or by the method of synthesis from monomeric or lower molecular weight polymercaptans.

The invention also includes the production and treatment of copolymers of the cross linked kind comprising not only the unit

but also the unit —SRS—. As already explained, a series of the units —RSR— constituting a segment or segments of chains may be used to effect spacing between a series of the units

in order to control the extent of cross linkage or space lattice density.

Where copolymers of the unit

and the unit —SRS— are made R' may have the same definition as R, i. e., R and R' may be radicals selected from the group consisting of

designating a simple carbon atom,

designating two adjacent carbon atoms and

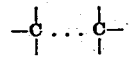

designating two carbon atoms joined to and separated by intervening linkage. In this case, therefore, the definition of R' is not necessarily the more limited one above given and may be coextensive with the definition of R.

The high molecular weight linear polymers employed for the cleavage treatment may be obtained by reacting an alkaline polysulfide with an organic compound containing at least one carbon atom and only two-carbon-attached substituents, e. g., halogen atoms or other substituents split off by reaction with said alkaline polysulfide, e. g., methylene dihalide, olefine dihalides, and many other bifunctional compounds, numerous examples of which will be seen by reference to the above-mentioned Patrick patents. This reaction leads to linear polymers composed essentially of the units —SRS— where R has the definition already given, i. e., a radical having structure selected from the group consisting of

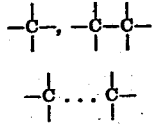

Substantially the same high molecular weight polymers may be obtained by starting with corresponding bifunctional mercapto compounds and oxidizing or condensing these compounds in accordance with the teachings in a number of Patrick patents including 2,142,145, January 3, 1939; and as already mentioned herein, this reaction can be so controlled that it will lead to polymers having a limited molecular size similar to those obtained by first producing the higher molecular weight polymers and then effecting a partial cleavage treatment.

In the production of the higher molecular weight cross linked polymers of the unit

(which may be subjected to a cleavage treatment as disclosed herein) where R' has the more limited definition above given, these may be obtained by the reaction of an alkaline polysulfide with organic compounds containing at least two carbon atoms and three or more carbon-attached substituents, e. g., halogen atoms, split off by reaction with said alkaline polysulfide. As already stated in these compounds, R' is a radical selected from the group consisting of

and

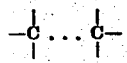

Examples of organic compounds containing at least two carbon atoms and at least three carbon-attached functional substituents are as follows, X signifying either a halogen atom or its equivalent or an SH group.

*Table I*

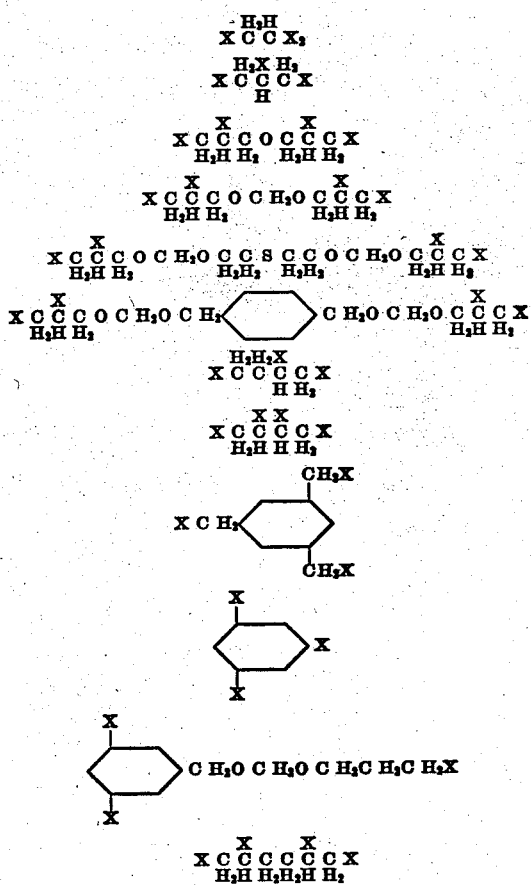

The said high molecular weight cross linked polymers may also be obtained by applying oxidation technique to monomeric compounds having at least two carbon atoms and at least three carbon-attached mercapto groups and these high molecular weight polymers may then be subjected to a cleavage treatment in the same manner as those polymers obtained by reaction between an alkaline polysulfide and compounds in general having at least two carbon atoms and at least three carbon-attached halogen atoms or their equivalent. Moreover the said monomeric mercapto compounds containing at least two carbon atoms and three or more carbon-attached mercapto groups may be subjected to a controlled oxidation treatment to produce products similar to those obtained by submitting high molecular weight polymers to a cleavage treatment by employing the principle that the number of oxygen atoms per molecular weight of the polymeric unit equals $$\frac{n-1}{n}$$

where $n$ is the number of units in the desired polymer.

The production and treatment of copolymers, that is, those containing not only the unit

—SR'S—
  S
  S
—SR'S— but also the unit —SRS— is of great value because it provides an added degree of control in respect of the properties of the products desired, that control residing in so proportioning the mols of bifunctional compound to those having a functionality of three or more that the degree of cross linkage or space lattice density can be widely varied. Numerous examples have been submitted illustrating this principle. In the specific examples given there has been shown the production of these copolymers by reacting an alkaline polysulfide with a mixture of a bifunctional compound and one having a functionality of three or more where the functionality is due to halogen atoms. These specific examples have shown the production of high molecular weight polymers which were then submitted to a cleavage treatment. Products having properties similar to those obtained by that treatment may be obtained by oxidizing a mixture containing a monomeric bimercapto compound and one containing three or more mercapto groups and effecting the control herein described so as to limit the molecular size and complexity of the product obtained by this controlled oxidation.

By the use therefore of compounds which are bifunctional in conjunction with those having a functionality of three or more, whether this functionality is due to halogen atoms or their equivalent (split off by reaction with alkaline polysulfides) or to mercapto groups which form polymers by oxidative condensation, polymers may be obtained composed not only of the unit

—SR'S—
  S
  S
—SR'S— but also of the unit —SRS— in any desired proportion.

It may be pointed out that where a solid product is desired, which when obtained either by the cleavage treatment or the mercapto synthesis method, has a consistency such that it may readily be processed, as for example, on rubber mixing rolls, the mol ratio of the compound having a functionality of three or more to the compound having a functionality of only two, to produce a copolymer, should not exceed about 1 to 25. The limitation employed to produce this specific effect has been illustrated in Example XI where the ratio of 1, 2, 3 trichlor propane to dichlor diethyl formal was 1 to 800. In general the effect of the compound having a functionality of three or more in producing cross linkage is made manifest even when the mol ratio of that compound to the bifunctional compound is as low as 1 to 2000. The ratio may be much higher than 1 to 25, indeed a compound having a functionality of three or more may be used without any bifunctional compound in order to produce a product having the highest possible space lattice density. The limitation which has been referred to is one which applies where it is desired to secure a solid product which may be readily processed and which at the same time will have a desired recovery from deformation, that is, a desired degree of resistance to cold flow.

It has been pointed out that where the polymer is composed wholly or essentially of the unit

—SR'S—
  S
  S
—SR'S—

R' has a definition as above given, more limited than the definition of R, i. e., the definition of R' does not include a radical having the structure

designating a single carbon atom whereas the definition of R includes that radical.

However, where the polymer is composed not only of the unit

—SR'S—
  S
  S
—SR'S— but also contains the linear unit —SRS— then and in that event the generic definition of the two radicals R and R' may be the same.

For example, whereas difficulty would be encountered in making a cross linked polymer by using carbon tetrachloride or chloroform alone, such compounds will readily produce cross linkage when copolymerized with a bifunctional compound. Examples are given as follows:

*Example XIX.*—To 2 liters of 2 molar $Na_2S_2$ solution are added 25 grams of $Mg(OH)_2$ freshly precipitated. The resulting suspension is heated to 60° C., and to it are added a mixture composed of 3 mols of dichlor diethyl formal and 0.12 mols of carbon tetrachloride over a period of about 30 minutes, the temperature being maintained at not over about 100° C. during addition of the halides. The reaction mixture is then maintained at about 100° C. for an hour, then diluted with water and settled. The supernatant liquid is decanted and to the residual latex is added one liter of the 2 molar $Na_2S_2$ solution and the product is heated with agitation to 90° C. for 30 minutes. It is again diluted and settled, the supernatant liquid decanted and the residual latex washed free from soluble salts. The latex is then acidified to a pH of about 4, coagulates to a rubber-like mass characterized by definite evidence of cross linkage as shown by comparison of the properties of the product obtained with those of the product obtained by proceeding in the same manner and omitting the carbon tetrachloride. Instead of acidifying the latex it may be subjected to a cleavage treatment as herein disclosed.

Instead of carbon tetrachloride, organic compounds in general containing three or four halogen atoms (or their equivalent) attached to the same carbon atom may be used, e. g., chloroform.

benzotrichloride, methyl chloroform (1,1,1 trichlorethane) and compounds in general having the formula $R-CX_3$ where X is a halogen atom and R is an organic monovalent radical.

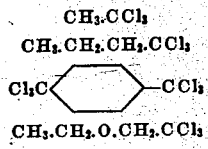

Even in the production of copolymers, however, containing the unit

and the unit —SRS— compounds are preferably used such that R' has the more limited definition above given, i. e., compounds having two or more carbon atoms and three or more carbon-attached functional substituents.

The principles of the invention may be applied to polymers in general characterized by a series of organic radicals joined by the disulfide —SS— linkage. Polysulfide polymers within the meaning of the present invention are as previously defined either linear polymers of the unit —SRS— or cross-linked polymers of the unit

or copolymers made up of polymer segments composed respectively of each of these units where S is a sulfide atom and R' is a radical having structure selected from the group consisting of

designating a single carbon atom

designating two adjacent carbon atoms and

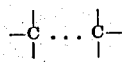

designating two carbon atoms joined to and separated by intervening structure.

The principles of the invention may however be applied to polymers other than polysulfide polymers where such other polymers contain or are characterized by the SS linkage as, for example, silk and wool. The following is an example of the application of the invention to such products.

*Example XX.*—500 grams of wool are wetted with one liter of water containing 5 grams of sodium stearate as a wetting agent in a 5-liter flask equipped with means for mechanical stirring. 200 cc. of a two-molar solution of sodium hydrosulfide are added to the flask and .5 of a mol of sodium sulfite are dissolved therein. The contents of the flask are allowed to digest on a water bath heated to about 60° or 70° C. for several hours until the wool is thoroughly disintegrated and the mixture has become fluid enough to start the agitator. Heating is then continued with mechanical agitation for about an hour on the boiling water bath, by which time the contents of the flask have become quite fluid. A current of air is passed through the liquid in the flask for a period of from two to three hours, maintaining the temperature at or near 100° C., at the end of which a sticky somewhat elastic polymer not having the physical structure of wool has been formed by the reoxidation of the split polymer.

*Curing the products*

In the above disclosure two general methods have been described for obtaining a polymer having a predetermined and controlled consistency measurable quantitatively in terms of viscosity or plasticity. Qualitatively the products may be classified as solids and liquids, at normal temperatures, i. e., at about 25° C. The consistency is in general a function of two factors (a) the molecular size and (b) the density of the space lattice or extent of cross linkage where such cross linkage exists, i. e., where the polymers are not wholly linear. The two general methods involve (1) the partial dismemberment or cleavage of more complex products to those of less complex structure and (2) the synthesis of more complex structures from those of simpler structure.

The products thus obtained are new and useful as such. They are reactive and may be transformed to a nonreactive condition in which properties such as insolubility, mechanical strength, elasticity, hardness, etc., are developed or increased, by polymerization or condensation. Since the transformation has an analogy to the vulcanization or curing of rubber it may be designated as curing and is so designated by those skilled in the art and the agents which accomplish that transformation are called curing agents.

In general substances which condense with the hydrogen of mercapto terminals act as curing agents. For example, condensing agents in general may be employed because their reaction with the mercapto terminals consists in the removal of hydrogen and the union of the sulfur atoms of the mercapto group into the continuous linkages. It is not, therefore, the specific character of the curing or condensing agent which accomplishes the condensation generally but the ability of that agent to react with mercapto groups. Therefore, oxidizing agents in general may be employed such as air, oxygen, peroxides, per salts, polysulfides and many oxygen containing salts such as the chromates, manganates, permanganates, molybdates, etc. However, the condensing agents are not limited to oxidizing agents because, as previously stated, condensing agents in general may be used which will react with mercapto groups. Therefore, aldehydes in general may be used since aldehydes react with mercapto groups to form mercaptal condensation products. Of course, the common commercially available aldehydes are naturally preferred for economic reasons, such as formaldehyde, acetaldehyde and furfuraldehyde. Instead of aldehydes, ketones in general may be employed as condensing agents. As a matter of fact, aldehydes and ketones act, in a sense, as oxidizing agents in relation to mercapto groups and therefore may be said to constitute a class of oxidizing agents, water being eliminated as a by-product by this process.

The following examples will illustrate the curing of the solid millable products and also the liquids.

*Example XXI.*—*Curing of the solid product, e. g., the coagulated split polymer.*—The coagulated or dried split polymer produced in accordance with the above disclosure as, for example, in accordance with Example XI, may be compounded with compounding and curing ingredients as follows:

| | Parts by weight |
|---|---|
| Split polymer of Ex. XI | 100 |
| Zinc oxide | 10 |
| Zinc chromate | 10 |
| Paraformaldehyde | 10 |
| Reinforcing carbon black | 60 |
| Stearic acid | 1 |

The above components are mixed on a conventional rubber mixing mill and placed in a steel mold and cured at a temperature of 310° F. for 30 minutes. The zinc chromate is the primary curing agent.

This product, when submitted to a standard A. S. T. M. test for "cold flow" shows an 80 percent recovery and, as above stated, is in marked contrast to a product produced from a linear polymer as, for example, one produced in accordance with Example I with the omission of the trifunctional compound, which product if cured in a manner identical with that shown in this Example XI would have zero recovery.

In the following Examples XXII to XXIV the curing of the liquid polymers will be illustrated and in these examples the polymers produced as in Examples XII and XIII may be used.

*Example XXII*—With about 100 parts by weight of the fluid polymer there are intimately mixed about 25 parts of lead peroxide. Curing starts immediately and is substantially completed without the application of any external heating in a period of about ten minutes.

*Example XXIII.*—Proceed as in Example XXIII except that to about 100 parts by weight of the liquid polymer are added about 25 parts by weight of zinc peroxide. The two are intimately mixed and in order to produce cure the mixture is heated to about 170° F. for a period of about one hour.

*Example XXIV.*—To 100 parts of carefully dried substantially anhydrous polymer are added 50 parts of dry zinc chromate and the two are intimately mixed. This master batch is capable of storage for considerable periods of time without undergoing any appreciable change in viscosity. When it is desired to apply the material in such a manner that it will cure to its final state, it is only necessary to add 100 parts of the polymer produced as in Example I and containing a small proportion of water, say of the order of 1 to 3%, since it has been found that in the case of some curing agents including zinc chromate and zinc peroxide the presence of an appreciable water content is necessary to get a high rate of cure. When said polymer is intimately mixed with the master batch described above polymerization takes place. This polymerization is capable of causing complete cure at ordinary room temperatures and may be very considerably accelerated by moderate heat, say to temperatures of the order of 150° F. to 180° F. A stable anhydrous mixture of the polymer with a curing agent, e. g., zinc peroxide or zinc chromate can readily be cured by the action of an alkali and when the said mixture is applied as a film gaseous alkalies, e. g., ammonia and amines may be used by exposing the coating to the vapor of said volatile alkalies.

Porous or fibrous material, e. g., leather, paper, felt, asbestos or fabric in general may first be provided in any suitable manner with a substance which will act as a curing agent. The curing agent may be incorporated with said material during the process of manufacturing thereof or may be impregnated into that material after the normal manufacturing process has been completed. The material thus provided with a curing agent is then impregnated with the polymer in its liquid form and the product is then cured.

In this as in other applications, numerous curing agents may be employed—lead peroxide, zinc peroxide, zinc chromate, lead chromate, litharge, red lead, quinone, hydrogen peroxide, lauryl peroxide, naphthenates of metals such as copper, lead, zinc, cobalt and manganese, aldehydes in general, and mixtures or combinations of these curing agents.

An advantageous method of proceeding as above indicated is the impregnation of porous materials with a curative, i. e., a curing agent, in dissolved or liquid form followed by impregnation with the liquid polymer. A number of organic salts of heavy metals, e. g., copper, lead, zinc, cobalt, manganese, etc., are soluble in organic solvents and solutions thereof may be used as curatives. For example, the lead salts of fatty acids from butyric acid up to stearic acid are soluble in benzene. The porous material may be impregnated with a solution of the salt, the solvents evaporated and the product then impregnated with the liquid polymer and cured by heating, e. g., to about 212° F. For example, leather or other porous material may be impregnated with a solution of lead octoate in benzene followed by evaporation of the benzene and impregnation with a liquid polymer obtained by the procedure in Example XIII. If the proportions are such that the product contains 12 parts by weight of lead octoate to 100 parts by weight of liquid polymer, curing takes place in eight hours at 212° C. A ratio of 25 parts of lead octoate to 100 of polymer reduces the curing time to four hours.

Porous or fibrous material, e. g., paper, felt, asbestos fiber, textile materials, leather, etc., may also be impregnated with the polymer and then or at some subsequent stage of the manufacturing operation exposed at ordinary or elevated temperatures to the necessary curing agent. The curing agent may be applied in a gaseous state, e. g., air, ozone, nitrogen peroxide, or small concentrations of halogen in moist air. The curing agent may be applied as a liquid, e. g., dilute solutions of hydrogen peroxide, hypohalites, quinone, etc.

The curing agent may be applied in a solid form, e. g., powdered lead peroxide, zinc peroxide, benzoyl peroxide, etc. These materials may also be applied as dispersions in water or other suitable dispersion material.

It has been found equally advantageous to apply coatings of the polymer to non-porous surfaces and cure the coating by any of the methods described above.

Another application for certain uses is the coating of a surface with film forming materials in general containing the curing agent, as a primer coat, then superimposing a coating of the fluid polysulfide polymer and permitting diffusion of the carrying agent from the undercoat into the polysulfide polymer layer to effect curing.

This principle may also be used to form laminated multiple layers with other coating materials.

Another use is the coating and lubrication of synthetic and other filaments in connection with the manufacture of yarns therefrom to make yarns, threads and fabrics having improved pliability, e. g., the coating of glass filaments in the manufacture of glass yarn and cloth.

Other uses of the polymer include the following: coatings in general for both porous and non-porous surfaces, impregnation, laminated structures, flexible adhesives especially for joinings which must retain flexibility at very low temperatures, putties and filleting materials especially where flexibility and resistance to the effects of solvents are required, can sealing compounds, and tank linings.

In many applications it is desirable to keep the liquid polymer in uncured condition or to hold the curing thereof in abeyance until the moment it is desired to effect curing or until the liquid polymer has reached its ultimate location. There has been described above the holding of the curing of the polymer in abeyance by adding the curing agent such as zinc peroxide or zinc chromate, to the polymer under anhydrous conditions and then adding water, as such, or by adding more polymer containing water or by exposing a film or coating of the polymer to a vapor, especially an alkaline vapor such as ammonia or amines, in the presence of moisture. Another method of controlling or selecting the time or moment when curing begins is to force the polymer through a nozzle and the curing agent through an adjacent nozzle so that mixing of the two streams occurs.

A stable compound may also be prepared by adding furfural to the liquid polymer. This compound is activated by acid and the acid may be added just prior to use or may be added to the material, e. g., porous material which is treated, e. g., impregnated with the compound. For example, with the liquid polymer there may be incorporated 10 to 50 per cent by weight of furfural. The furfural is soluble in the polymer and the mixture is stable, i. e., curing (polymerization or condensation) does not occur until activated. Acids and acid compounds in general will cause activation and may be added just before use. Formic acid is a convenient activator since it readily volatilizes when the product treated with the activated compound is heated, e. g., to 212° F. to accelerate curing.

The unique properties of the liquid and solid polymers of this invention can be imparted to a considerable extent to other substances such as natural and synthetic polymers and elastomers by mixtures or combination of the liquid polysulfide polymer with said materials.

Conversely the properties of the said polymers can be modified by suitable combinations with the polymer of such substances as rubber and the synthetic butadiene polymers and copolymers, cellulose esters and ethers, vinyl ester polymers and copolymers, polyamide polymers (e. g., nylon), polystyrenes, acrylic polymers, vinylidene polymers and copolymers, e. g., the copolymer of vinyl chloride and vinylidene chloride, phenol-formaldehyde resins, urea-aldehyde and melaminealdehyde resins, polybasic acid—polyhydric alcohol resins, alkyd and modified alkyd resins, rosin and natural resins, polyvinyl alcohol, polyvinyl acetals, coumarone resins, polyethylene resins, polymerizable fatty acids and their esters and polymers thereof, rubber hydrochloride, halogenated rubber.

Another valuable use of the liquid polymers of this invention is in plasticizing other polymers. This value resides in part in the fact that the liquid polymer can be cured while intimately mixed with or dissolved or dispersed in said other polymer. Many plasticizers remain in the final product in the same condition in which they existed when originally incorporated and since they are, in general, soluble in various solvents, they are extractable from the final product. For many purposes a plasticizer which itself may be transformed from a soluble liquid condition to an insoluble solid condition is desirable and the liquid polymers of this invention may be used to supply that need.

This use will be illustrated by the following examples.

Example XXV

| | Parts by weight |
|---|---|
| Solid polymer of Example XI | 100.0 |
| Zinc oxide | 0.5 |
| Paraquinone dioxime | 1.5 |
| Stearic acid | 1.0 |
| Carbon black | 60.0 |

Example XXVI

| | Parts by weight |
|---|---|
| Solid polymer of Ex. XI | 80.0 |
| Liquid polymer of Ex. XIII | 20.0 |
| Zinc oxide | 0.75 |
| Paraquinone dioxime | 2.00 |
| Stearic acid | 1.00 |
| Carbon black | 60.00 |

The uncured product of Example XXVI is much softer than the uncured product of Example XXV. Yet when both products are cured, e. g., by heating to 310° F. for about 30 minutes, the cured products have substantially the same properties. In this case the liquid polymer copolymerizes with the solid polymer during the curing action and although the liquid polymer is per se readily soluble in solvents, e. g., gasoline, and benzene, it is not extractable by those solvents after curing and the cured product of Example XXVI shows the same insolubility as the cured product of Example XXV.

The liquid polymer may be used as plasticizers for many polymers other than polysulfide polymers.

This application is a continuation-in-part of our copending applications Serial No. 502,298, filed September 14, 1943 and Serial No. 512,594, filed December 2, 1943, each now abandoned.

What is claimed is:

1. A polythiopolymercaptan having a molecular weight of about 500 to 12,000 and existing at 25° C. as a liquid.

2. Process which comprises reacting a polysulfide polymer (A) comprising recurring units selected from the group consisting of —SRS— and R'(S—)$_x$ where S is a sulfur atom, R is a radical having a sulfur-connected valence of two and R' is a radical having a sulfur-connected valence equal to $x$ where $x$ is a whole number greater than two, said radicals being selected from the groups consisting of

designating a single carbon atom,

designating two adjacent carbon atoms and

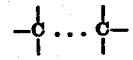

designating two carbon atoms joined to and separated by intervening structure, with a compound having the formula MPM where P is an element selected from the group consisting of oxygen and sulfur and M is selected from the group consisting of hydrogen, alkali metals, alkaline earth metals and ammonium, and an acceptor for P capable of combining with P under the conditions of the reaction to form a stable non-oxidizing compound, and producing a polymer (B) having an average molecular weight less than that of polymer (A), the mol ratio of the compound MPM and the substance capable of combining with P to form a stable non-oxidizing compound, to the average unit molecular weight of polymer (A) being not less than $1/n$ where $n$ is the number of units in polymer (B) resulting from said reaction.

3. Process according to claim 2 in which the compound MPM is an alkaline monosulfide.

4. Process according to claim 2 in which the compound MPM is an alkaline hydrosulfide.

5. Process according to claim 2 in which the compound MPM is hydrogen sulfide.

6. Process according to claim 2 in which the polysulfide polymer (A) contains both of the recurring units —SRS— and R' (S—)$_x$.

7. Process according to claim 2 in which the polysulfide polymer (A) is a polysulfide rubber containing both of the recurring units —SRS— and R' (S—)$_x$ and the mol ratio of the units —SRS— to the units R' (S—)$_x$ is about 2000:1 to 25:1.

8. Process according to claim 7 in which the compound MPM is an alkaline monosulfide.

9. Process according to claim 7 in which the compound MPM is an alkaline hydrosulfide.

10. Process according to claim 7 in which the compound MPM is hydrogen sulfide.

11. Process according to claim 2 in which an aqueous dispersion of polymer (A) is reacted, said polymer when separated from said dispersion being a solid product at 25° C. and said polymer containing both of the recurring units —SRS— and R' (S—)$_x$ the mol ratio of the units —SRS— to the units R' (S—)$_x$ being from about 2000:1 to 25:1, and polymer (B) is obtained said polymer (B) when separated from its dispersion being a liquid at 25° C.

12. Process according to claim 11 in which the compound MPM is an alkaline monosulfide and the acceptor for P is an alkaline sulfite.

13. Process according to claim 11 in which the compound MPM is an alkaline hydrosulfide and the acceptor for P is an alkaline sulfite.

14. Process according to claim 11 in which the compound MPM is hydrogen sulfide and the acceptor for P is an alkaline sulfite.

15. Process according to claim 2 in which an aqueous dispersion of polymer (A) is reacted, said polymer (A) when separated from said dispersion being a solid difficulty millable product and said polymer containing both of the recurring units —SRS— and R' (S—)$_x$, the mol ratio of the units —SRS— to the units R' (S—)$_x$ being from about 2000:1 to 25:1, and polymer (B) is obtained said product when separated from its dispersion being solid at 25° C. and also being readily millable.

16. Process according to claim 15 in which the compound MPM is an alkaline monosulfide and the acceptor for P is an alkaline sulfite.

17. Process according to claim 15 in which the compound MPM is an alkaline hydrosulfide and the acceptor for P is an alkaline sulfite.

18. Process according to claim 15 in which the compound MPM is hydrogen sulfide and the acceptor for P is an alkaline sulfite.

19. Process according to claim 2 in which the polymer (A) is composed essentially of the unit —SRS—.

20. Process according to claim 19 in which the compound MPM is an alkaline monosulfide.

21. Process according to claim 19 in which the compound MPM is an alkaline hydrosulfide.

22. Process according to claim 19 in which the compound MPM is hydrogen sulfide.

23. Process which comprises reacting a polysulfide polymer (A) comprising recurring units selected from the group consisting of —SRS— and R' (S—)$_x$ where S is a sulfur atom, R is a radical having a sulfur-connected valence of two and R' is a radical having a sulfur-connected valence equal to $x$ where $x$ is a whole number greater than two, said radicals being selected from the groups consisting of

designating a single carbon atom,

designating two adjacent carbon atoms and

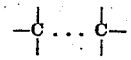

designating two carbon atoms joined to and separated by intervening structure, with a compound having the formula MPM where P is an element selected from the group consisting of oxygen and sulfur and M is selected from the group consisting of hydrogen, alkali metals, alkaline earth metals and ammonium, and an acceptor for P capable of combining with P under the conditions of the reaction to form a stable non-oxidizing compound, and producing a polymer (B) having an average molecular weight less than that of polymer (A).

24. Process according to claim 23 in which the compound MPM is an alkaline monosulfide.

25. Process according to claim 23 in which the compound MPM is an alkaline hydrosulfide.

26. Process according to claim 23 in which the compound MPM is hydrogen sulfide.

27. Process according to claim 23 in which the polysulfide polymer (A) contains both of the recurring units —SRS— and R' (S—)$_x$ the mol ratio of the unit —SRS— to the unit R' (S—)$_x$ being from about 2000:1 to 25:1.

28. Process according to claim 27 in which the compound MPM is an alkaline monosulfide.

29. Process according to claim 27 in which the compound MPM is an alkaline hydrosulfide.

30. Process according to claim 27 in which the compound MPM is hydrogen sulfide.

31. Process according to claim 23 in which the polymer (A) is composed essentially of the unit —SRS—.

32. Process according to claim 31 in which the compound MPM is an alkaline monosulfide.

33. Process according to claim 31 in which the compound MPM is an alkaline hydrosulfide.

34. Process according to claim 31 in which the compound MPM is hydrogen sulfide.

35. Process which comprises reacting a polysulfide polymer (A) comprising both of the recurring units —SRS— and R' (S—)$_x$ where S is a sulfur atom, R is a radical having a sulfur connected valence of two and R' is a radical having a sulfur-connected valence equal to X where X is a whole number greater than two, said radicals being selected from the group consisting of

designating a single carbon atom,

designating two adjacent carbon atoms and

designating two carbon atoms joined to and separated by intervening structure, with a compound having the formula MPM where P is an element selected from the group consisting of oxygen and sulfur and M is selected from the group consisting of hydrogen, alkali metals, alkaline earth metals and ammonium, and an acceptor for P capable of combining with P under the conditions of the reaction to form a stable non-oxidizing compound and producing a polymer (B) having an average molecular weight less than that of polymer (A) said polymer (B) being solid at 25° C.

36. A product made according to the process of claim 35.

37. A polythio polymercaptan existing at 25° C. as a liquid and having multiply recurring disulfide (—SS—) linkages between carbon atoms.

JOSEPH C. PATRICK.
HARRY R. FERGUSON.

REFERENCES CITED

The following references are of record in the file of this patent:

UNITED STATES PATENTS

| Number | Name | Date |
| --- | --- | --- |
| 2,031,529 | Elbel et al. | Feb. 18, 1936 |
| 2,050,370 | Orthner et al. | Aug. 11, 1936 |
| 2,051,806 | Allen | Aug. 25, 1936 |
| 2,180,262 | Sturm | Nov. 14, 1939 |
| 2,261,094 | Speakman | Oct. 28, 1941 |
| 2,278,129 | Patrick | Mar. 31, 1942 |
| 2,389,755 | Baker | Nov. 27, 1945 |
| 2,405,166 | Reed et al. | Aug. 6, 1946 |
| 2,417,118 | McCleary et al. | Mar. 11, 1947 |

FOREIGN PATENTS

| Number | Country | Date |
| --- | --- | --- |
| 228,868 | Germany | Nov. 24, 1910 |
| 453,701 | Great Britain | Sept. 20, 1936 |
| 458,781 | Great Britain | Dec. 28, 1936 |

OTHER REFERENCES

Patrick, article in Trans. Faraday Soc., vol. 32, pages 347–358, January, 1936.

Martin et al., article in Ind. Eng. Chem., Oct. 1936, pages 1144–1149.

Michaelis, "A study of keratin." Jor. Am. Leather Chemists Assoc., vol. 30, pp. 557–568, Nov. 1935.

Certificate of Correction

Patent No. 2,466,963.  April 12, 1949.

JOSEPH C. PATRICK ET AL.

It is hereby certified that errors appear in the printed specification of the above numbered patent requiring correction as follows:

Column 3, line 61, for "moldeed" read *molded*; line 75, for "veen" read *even*; column 5, line 66, for "—S— linkages" read *—SS— linkages*; col. 31, line 35, for "Example XXIII", second occurrence, read *Example XXII*; column 35, line 58, claim 15, for "difficulty" read *difficultly*;

and that the said Letters Patent should be read with these corrections therein that the same may conform to the record of the case in the Patent Office.

Signed and sealed this 1st day of November, A. D. 1949.

[SEAL]

THOMAS F. MURPHY,
*Assistant Commissioner of Patents.*